United States Patent
Motomochi et al.

(10) Patent No.: US 9,434,343 B2
(45) Date of Patent: Sep. 6, 2016

(54) AIRBAG AND AIRBAG DEVICE

(71) Applicants: Akihiro Motomochi, Tokyo (JP); Kei Tsujimoto, Tokyo (JP)

(72) Inventors: Akihiro Motomochi, Tokyo (JP); Kei Tsujimoto, Tokyo (JP)

(73) Assignee: TAKATA CORPORATION, Tokyo (JP)

( * ) Notice: Subject to any disclaimer, the term of this patent is extended or adjusted under 35 U.S.C. 154(b) by 0 days.

(21) Appl. No.: 14/276,533

(22) Filed: May 13, 2014

(65) Prior Publication Data

US 2014/0339798 A1    Nov. 20, 2014

(30) Foreign Application Priority Data

May 20, 2013  (JP) ................................. 2013-105857

(51) Int. Cl.
*B60R 21/231*    (2011.01)
*B60R 21/205*    (2011.01)
*B60R 21/2346*   (2011.01)

(52) U.S. Cl.
CPC .......... *B60R 21/231* (2013.01); *B60R 21/205* (2013.01); *B60R 21/2346* (2013.01)

(58) Field of Classification Search
CPC .... B60R 21/205; B60R 21/23; B60R 21/231
See application file for complete search history.

(56) References Cited

U.S. PATENT DOCUMENTS

| | | | |
|---|---|---|---|
| 5,364,124 A * | 11/1994 | Donegan et al. ........... | 280/730.1 |
| 5,454,594 A * | 10/1995 | Krickl ......................... | 280/743.1 |
| 5,520,414 A * | 5/1996 | Bishop ........................ | 280/743.1 |
| 5,529,340 A * | 6/1996 | Fairbanks ................... | 280/743.1 |
| 5,782,488 A * | 7/1998 | Lewis et al. ................ | 280/743.1 |
| 2002/0063416 A1* | 5/2002 | Kamaiji et al. ............ | 280/728.2 |
| 2009/0115177 A1* | 5/2009 | Pausch et al. ............. | 280/743.2 |
| 2009/0127833 A1* | 5/2009 | Rick .......................... | 280/728.2 |
| 2009/0152842 A1* | 6/2009 | Benny et al. ............... | 280/728.3 |
| 2011/0088356 A1* | 4/2011 | Lachat et al. ................... | 53/429 |
| 2011/0133437 A1* | 6/2011 | Jang et al. ................. | 280/743.2 |
| 2011/0260431 A1* | 10/2011 | Kwon ......................... | 280/730.1 |
| 2012/0013106 A1* | 1/2012 | Sato et al. .................... | 280/729 |
| 2012/0205899 A1* | 8/2012 | Gulde et al. .................. | 280/732 |
| 2012/0261910 A1* | 10/2012 | Fischer et al. ............... | 280/732 |
| 2012/0306187 A1* | 12/2012 | Mendez et al. ............. | 280/743.2 |
| 2013/0055942 A1* | 3/2013 | Sekino ....................... | 112/475.08 |
| 2013/0087997 A1* | 4/2013 | Sekino .......................... | 280/732 |
| 2013/0292928 A1* | 11/2013 | Tsujimoto .................. | 280/730.1 |

FOREIGN PATENT DOCUMENTS

| | | |
|---|---|---|
| JP | H02-132555 U | 11/1990 |
| JP | H05-105024 A | 4/1993 |

(Continued)

*Primary Examiner* — Barry Gooden, Jr.
(74) *Attorney, Agent, or Firm* — Manabu Kanesaka

(57) ABSTRACT

An airbag and an airbag device are provided in which a posture of inflation and deployment of the airbag can be held easily and simply even if the airbag is mounted on an instrument panel having a convex portion in the space of inflation and deployment of the airbag. An airbag device includes an airbag that is folded and housed in an opening portion of an instrument panel during a normal state and is inflated and deployed on a surface of the instrument panel by gas supplied in an emergency; an inflator that supplies gas to the airbag; a retainer that holds the airbag and the inflator; and an airbag cover that covers the airbag and configures a part of the instrument panel, in which the airbag has a concave portion formed in both lower side portions when the airbag is inflated and deployed.

7 Claims, 8 Drawing Sheets

(56) References Cited

FOREIGN PATENT DOCUMENTS

| | | |
|---|---|---|
| JP | H07-267032 A | 10/1995 |
| JP | 2005-014864 A | 1/2005 |
| JP | 2007-038713 A | 2/2007 |
| JP | 2009-190573 A | 8/2009 |
| JP | 2011-173471 A | 9/2011 |
| JP | 2011-173473 A | 9/2011 |
| WO | 00/12359 A | 3/2000 |

* cited by examiner

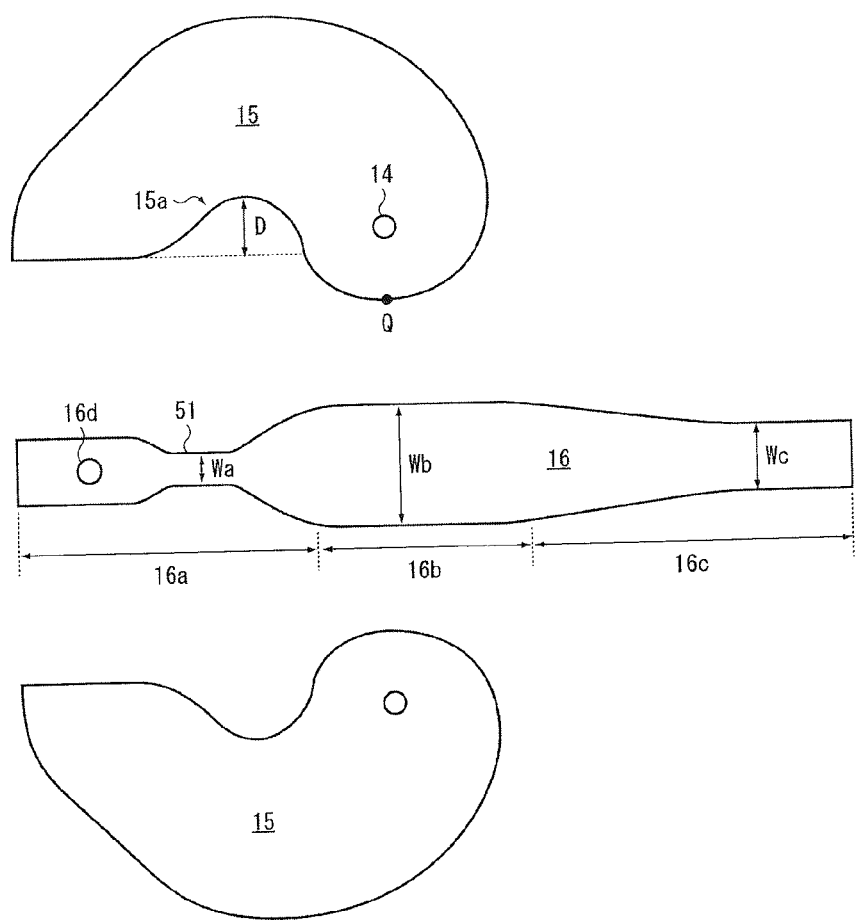

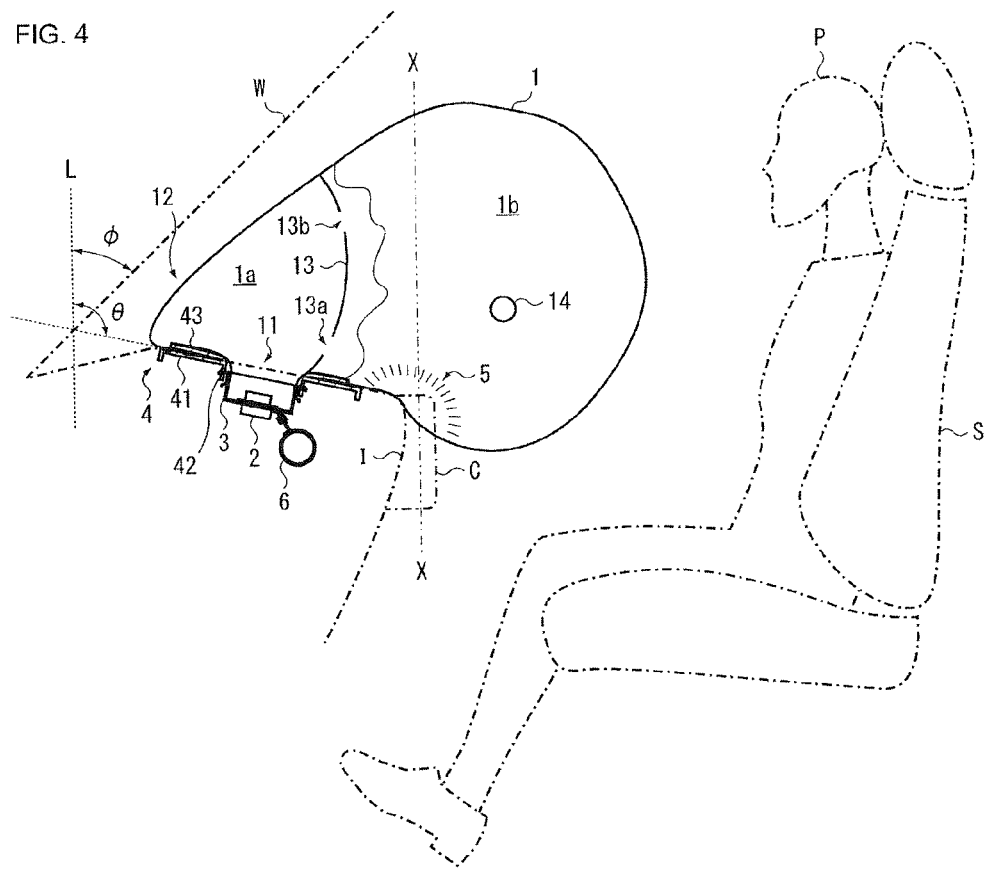

AIRBAG AND AIRBAG DEVICE

RELATED APPLICATIONS

The present application is based on, and claims priority from, Japanese Application No. JP2013-105857 filed May 20, 2013, the disclosure of which is hereby incorporated by reference herein in its entirety.

FIELD OF THE INVENTION

The present invention relates to an airbag and an airbag device, and more specifically, to an airbag that is suitable for mounting on an instrument panel having a convex portion in the space of inflation and deployment of the airbag and an airbag device.

BACKGROUND OF THE INVENTION

In a vehicle such as an automobile, generally, an airbag device is mounted to absorb an impact on an occupant by inflating and deploying an airbag inside the vehicle in an emergency such as collision or a rapid deceleration thereof. Generally, an airbag device has an airbag that is folded during a normal state and is inflated and deployed in an emergency, an inflator that supplies gas to the airbag, a retainer that holds the airbag and the inflator, and an airbag cover that covers the airbag.

At a time of collision or a rapid deceleration of the vehicle, the airbag is inflated by being supplied gas from the inflator to the airbag and the airbag cover is opened, and the airbag is discharged into the vehicle, and then the airbag is inflated and deployed. Particularly, in a case of a passenger airbag device, the airbag is mounted inside an opening portion formed in the instrument panel and is inflated and deployed in a space surrounded by the instrument panel, a windshield (a front window) and an occupant.

If an obstacle exists in the inflation and deployment space of the airbag, the airbag collides with the obstacle and a posture (for example, an orientation or a position) thereof is collapsed so as not to inflate and deploy the airbag as planned. Thus, for example, as described in Japanese Unexamined Patent Application Publication No. 2005-14864 or Japanese Unexamined Patent Application Publication No. 2007-38713, an airbag capable of avoiding an obstacle is already proposed.

For example, in the airbag described in Japanese Unexamined Patent Application Publication No. 2005-14864, if the airbag comes into contact with the obstacle when the airbag is inflated and deployed, a variable vent hole is held in an open state so as to adjust an internal pressure thereof and thus the inflation and deployment of the airbag is stabilized. Further, the airbag described in Japanese Unexamined Patent Application Publication No. 2007-38713 is configured to include a sub-bag portion configuring a sub-chamber on a lower side of the airbag, and to suppress the impact by housing the obstacle adjacent to the instrument panel from the opening portion into the sub-chamber.

SUMMARY OF INVENTION

However, in recent years, in view of computerization of a vehicle, improvement of interior comfort and the like, a liquid crystal panel for displaying a screen of car navigation or a television broadcast is increasingly mounted on the vehicle. The liquid crystal panel is often disposed in a center portion of a front surface of the instrument panel in front of an occupant together with an audio device or an air-conditioning device and the like as a control panel. As a result, the instrument panel has a convex portion in front of the occupant and the convex portion may be disposed in the inflation and deployment space of the airbag. Further, a cup holder or a bottle holder may be disposed in the instrument panel in front of the occupant near a door of the vehicle, and this part also forms the convex portion of the instrument panel in front of the occupant.

In order to avoid the collision between the convex portion and the airbag, when employing the airbag described in Japanese Unexamined Patent Application Publication No. 2005-14864, there is a problem that the internal pressure of the airbag is decreased and an opening and closing mechanism of the vent hole is complicated, and then this becomes a factor of an increase in cost and the like. Further, when employing the airbag described in Japanese Unexamined Patent Application Publication No. 2007-38713, there is a problem that the sub-bag portion becomes large and adjustment of the internal pressure of the airbag is difficult, and a structure is complex. All of which become a factor of an increase in cost and the like.

The present invention is made in view of such problems and an object of the invention is to provide an airbag in which a posture of inflation and deployment of the airbag can be easily and simply held even if the airbag is mounted on an instrument panel having a convex portion in an inflation and deployment space of the airbag, and an airbag device.

According to the invention, an airbag is provided that is folded and housed in an opening portion of an instrument panel during a normal state and is inflated and deployed on a surface of the instrument panel by gas supplied in an emergency. The airbag has a concave portion formed in at least one of both lower side portions when the airbag is inflated and deployed.

According to the invention, an airbag device is provided, wherein the airbag device includes an airbag that is folded and housed in an opening portion of an instrument panel during a normal state and is inflated and deployed on a surface of the instrument panel by gas supplied in an emergency; an inflator that supplies gas to the airbag; a retainer that holds the airbag and the inflator; and an airbag cover that covers the airbag and configures a part of the instrument panel, in which the airbag has a concave portion formed in at least one of both the lower side portions when the airbag is inflated and deployed.

In the airbag and the airbag device according to the invention described above, for example, the concave portion is disposed in a position where the concave portion is capable of avoiding a convex portion formed in the instrument panel.

Further, the airbag may have at least a pair of side panels that configure both the lower side portions and a center panel that connects each of lower portions of each of the side panels, and the concave portion may be formed by a narrow width portion formed in the center panel.

Further, the center panel may have a lower surface forming portion that configures a lower surface of the airbag, a front surface forming portion that configures a surface coming into contact with an occupant and an upper surface forming portion that configures an upper surface of the airbag, and the narrow width portion may be configured of a portion in which a width of at least a part of the lower surface forming portion is narrower than those of the front surface forming portion and the upper surface forming portion.

Further, the concave portion may be formed by a tether that connects inner surfaces of both the lower side portions of the airbag.

According to the airbag and the airbag device of the invention described above, it is possible to form the concave portion on at least one of both the lower side portions of the airbag that is inflated and deployed, and even if the convex portion is formed on the surface of the instrument panel, it is possible to expand and develop the airbag while avoiding the convex portion, and it is possible to maintain the posture of the inflation and deployment of the airbag. Further, it is possible to avoid the convex portion only by forming the concave portion in the airbag and it is possible to reduce factors of the increase in cost.

BRIEF DESCRIPTION OF DRAWINGS

FIG. 2 is a panel configuration view of the airbag illustrated in FIG. 1.

FIG. 3 is a front view illustrating a shape of inflation and deployment of an airbag illustrated in FIG. 1, in which

FIG. 4 is an entire configuration view illustrating an airbag device according to a second embodiment of the invention.

FIG. 6 is a front view illustrating a shape of inflation and deployment of the airbag illustrated in FIG. 4, in which

FIG. 7 is a view illustrating an airbag device according to other embodiments of the invention, in which

FIG. 8 is a view illustrating an airbag device according to a sixth embodiment of the invention, in which

DETAILED DESCRIPTION OF THE PREFERRED EMBODIMENTS

Figure 1:
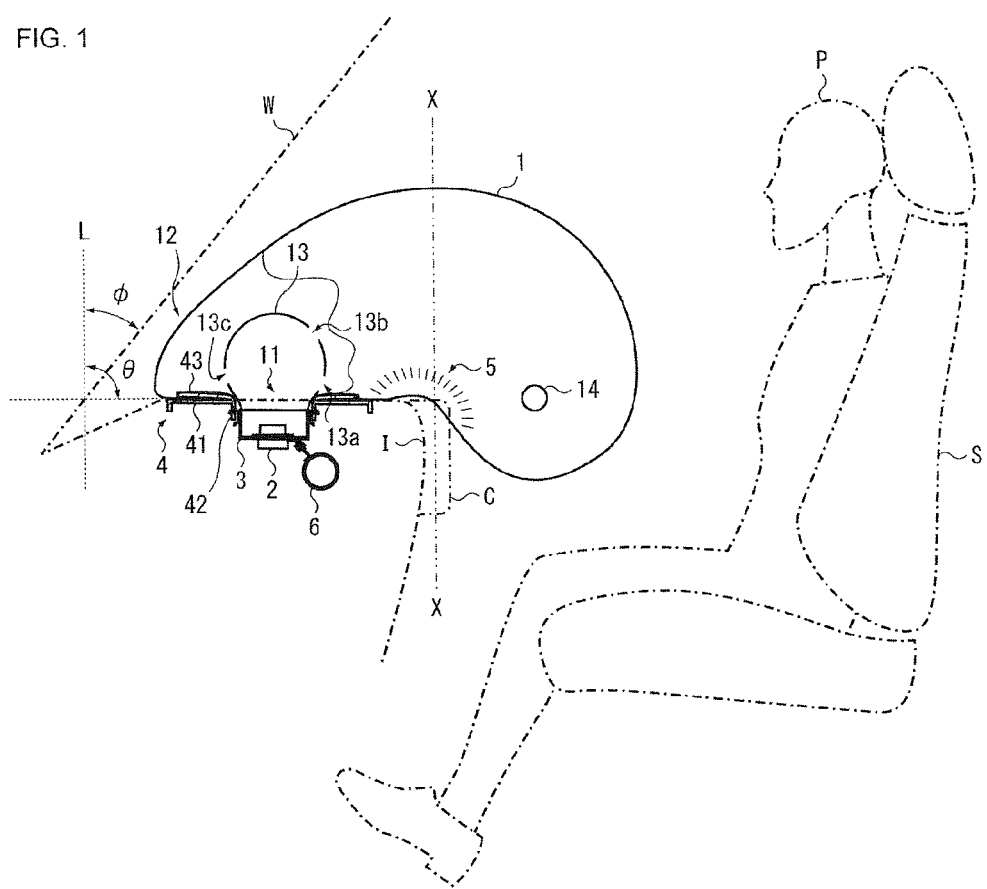
FIG. 1 is an entire configuration view illustrating an airbag device according to a first embodiment of the invention.
Figure 3A:
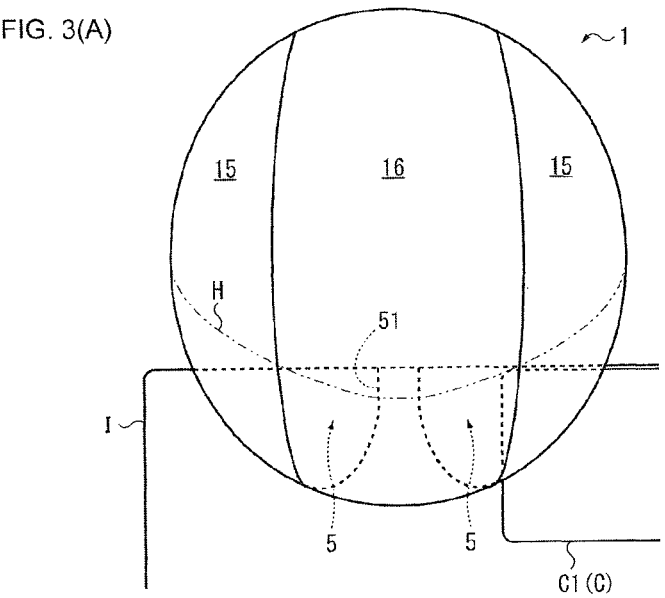
FIG. 3(A) illustrates a first example and FIG. 3(B) illustrates a second example.
Figure 3B:
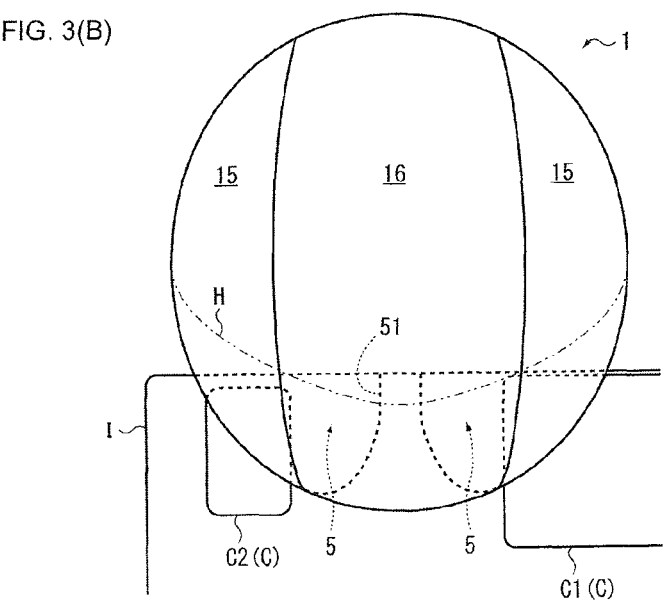

Hereinafter, embodiments of the invention are described with reference to FIGS. 1 to 8. FIG. 1 is an entire configuration view illustrating an airbag device according to a first embodiment of the invention. FIG. 2 is a panel configuration view of the airbag illustrated in FIG. 1. FIG. 3 is a front view illustrating the shape of inflation and deployment of the airbag illustrated in FIG. 1, in which FIG. 3(A) illustrates a first example and FIG. 3(B) illustrates a second example. In FIG. 1, for convenience of description, portions other than the airbag device are illustrated in alternate long and short dash lines.

As illustrated in FIGS. 1 to 3, the airbag device according to the first embodiment of the invention has an airbag 1 that is folded and housed in an opening portion of an instrument panel I in a normal state and is inflated and deployed on a surface of the instrument panel I by being supplied gas into the airbag 1 in an emergency, an inflator 2 that supplies gas to the airbag 1, a retainer 3 that holds the airbag 1 and the inflator 2, and an airbag cover 4 that covers the airbag 1 and configures a part of the instrument panel I. The airbag 1 has concave portions 5 which are formed in both lower side portions when the airbag is inflated and deployed. Moreover, in the airbag 1 according to the embodiment, an up-down direction means a vertical direction of a vehicle and a front-back direction means a direction coinciding with a front-back direction of the vehicle.

The airbag device illustrated in FIG. 1 is a so-called passenger airbag device and the airbag 1 is, for example, inflated and deployed in a space surrounded by an occupant P who is seated on a seat S, a windshield W and the instrument panel I. When an angle formed by an upper surface portion of the instrument panel I in which the airbag device is disposed and a vertical line L is defined as $\theta$, and an angle formed by the windshield W and the vertical line L is defined as $\phi$, the angle $\theta$ of the instrument panel I is approximately 90°. The angles $\theta$ and $\phi$ are subject to change based on the type of a vehicle in which the airbag device is mounted, and are not limited to the illustrated angles.

Further, a convex portion C is formed in a front surface of the instrument panel I in front of the occupant. For example, the convex portion C may be a portion that forms a control panel portion including a liquid crystal panel displaying a screen of car navigation or a television broadcast, an audio device, an air conditioning device and the like and may be a wind outlet of an air conditioner, and may be a cup holder or a bottle holder that is attached to the instrument panel I. Moreover, in the embodiment, "forming the convex portion C" is not limited to a case where a shape of the instrument panel I is deformed in a convex shape and is also intended to include a case where the convex portion is formed by attaching another part to the instrument panel I.

The airbag 1, as illustrated, may be a self-standing airbag so as not to contact the windshield W in a state where the inflation and deployment are completed. Such a self-standing airbag, in a state where the deployment as well as inflation is completed, is configured to maintain a lower surface of the airbag 1 in a state of coming into close contact with the surface of the instrument panel I without using a reaction force from the windshield W.

"The airbag 1 stands by itself", as illustrated, is not limited to a case where there is a degree of gap between the airbag 1 of which the inflation and deployment are completed and the windshield W, and is intended to include a case where the reaction force from the windshield W is small and the airbag 1 substantially stands by itself even if the airbag 1 comes into contact with the windshield W.

A configuration of a case where the airbag 1 is the self-standing airbag is described. A tail portion 12 that contacts with the surface of the instrument panel I forward more than an opening portion 11 in which the airbag 1 is housed is formed in the front portion of the airbag 1, in a state where the inflation and deployment are completed. It is possible for the front portion of the airbag 1 to come into contact with the surface of the instrument panel I by maintaining an internal pressure of the tail portion 12 and it is possible to suppress a behavior of the airbag 1 of rotating to the front side by an inertial force when the airbag 1 is inflated and deployed.

Further, a rectification body 13 that controls the flow of supplied gas may be disposed inside the airbag 1. The rectification body 13 is formed in a bag shape and has a first opening portion 13a that discharges gas so that the lower surface of the airbag 1 comes into close contact with the surface of the instrument panel I, a second opening portion 13b that discharges gas toward an upper surface side of the airbag 1, and a third opening portion 13c that discharges gas toward the tail portion 12. It is possible to easily maintain the internal pressure of the tail portion 12 by disposing the rectification body 13. Moreover, in FIG. 1, for convenience of the description of the side of the front portion of the airbag 1, an inner portion of the airbag 1 is illustrated by removing a part of base fabric.

Further, a vent hole 14 that discharges gas inside the airbag 1 to the outside when the occupant P comes into contact with the airbag 1 may be formed on a rear side surface of the airbag 1. It is preferable that the vent hole 14 be formed in a position spaced from the tail portion 12 to an extent that does not affect the maintenance of the internal pressure of the tail portion 12. Moreover, even though not illustrated, it is possible to increase the rigidity of the front portion of the airbag 1 by disposing a patch cloth in the outer peripheral surface of the tail portion 12 of the airbag 1.

FIG. 1 illustrates a state where the inflation and deployment of the airbag 1 is completed and a surface of an airbag cover 4 forms a part of the instrument panel I in a state before the airbag 1 is inflated and deployed. Further, as illustrated in FIG. 1, the airbag cover 4 has a plate portion 41 that configures a vehicle interior surface and an inner case 42 that configures a discharge port of the airbag 1 disposed in a back surface of the plate portion 41. The plate portion 41 has a door portion 43 that is formed to be opened when the airbag 1 is inflated and deployed. A configuration in which the airbag cover 4 is fitted into the opening portion formed in the instrument panel I is illustrated, but the airbag cover 4 may be integrally formed with the instrument panel I. Moreover, the configuration of the airbag cover 4 is not limited to the illustrated example and it is possible to appropriately select and use the conventional airbag cover.

An exterior of the inflator 2 has a substantially cylindrical shape and a gas ejection port is formed in a side peripheral surface of the leading end portion stored in the airbag 1. The inflator 2 is fixed to the retainer 3 by fixing means such as a bag ring by fitting into the opening portion formed in the retainer 3. Further, the inflator 2 is connected to an electronic control unit (ECU) (not illustrated) and is controlled based on a measured value of an acceleration sensor or the like. If the ECU senses an emergency such as collision or a rapid deceleration of the vehicle, gas is generated by burning a medicinal substance stored inside the inflator 2 and gas is supplied to the airbag 1. Moreover, a shape or a fixing method of the inflator 2 is not limited to the illustrated configuration and it is possible to appropriately select and use the configuration which is conventionally used.

For example, the retainer 3 is caught in a catch hole formed in the inner case 42 by a hook connected to the side surface portion and is connected to a structure 6 inside the vehicle such as a reinforcement through a bonding member. Moreover, the retainer 3 and a connecting structure thereof are not limited to the illustrated example and it is possible to appropriately select and use the retainer and the structure which are conventionally used.

The concave portion 5 formed in the airbag 1, as illustrated, is formed in a position capable of avoiding the convex portion C formed in the instrument panel I. For example, the airbag 1 having the concave portion 5 is formed by a plurality of base fabrics having panel shapes illustrated in FIG. 2. As illustrated in FIG. 2, the airbag 1 has a pair of side panels 15 configuring both end portions and a center panel 16 connecting the side panels 15 to each other. The concave portion 5 is formed of a narrow width portion 51 formed in the center panel 16. Moreover, in FIG. 2, for the sake of convenience of the description, a seam allowance portion of each panel is omitted in the view.

The side panels 15 are the base fabrics configuring both side portions of the airbag 1 (that is, including both the lower side portions) and are formed in a shape corresponding to a shape of the inflation and deployment of the airbag 1. As illustrated in FIG. 1, in the airbag 1 that is inflated and deployed from the instrument panel I so as to cover the front surface of the occupant, the side panels 15 are formed in curved shapes. In a curved portion 15a of the side panel 15 corresponding to a portion configuring a lower portion of the airbag 1, a depth D or a position of a rear lowest endpoint Q is arbitrarily adjusted depending on the conditions of the angle θ of the instrument panel I, the angle φ of the windshield W and the like. Further, the vent hole 14 is formed in the side panel 15.

The center panel 16 has a lower surface forming portion 16a that configures the lower surface of the airbag 1, a front surface forming portion 16b that configures an occupant contact surface, and an upper surface forming portion 16c that configures the upper surface of the airbag 1. The narrow width portion 51 is configured of a portion in which a width Wa of a part of the lower surface forming portion 16a is narrower than widths Wb and Wc of the front surface forming portion 16b and the upper surface forming portion 16c. As illustrated, the center panel 16 can be divided into the lower surface forming portion 16a, the front surface forming portion 16b and the upper surface forming portion 16c, and is sewn along the outer periphery of the side panel 15. Further, an opening portion 16d into which the inflator 2 is inserted is formed in the lower surface forming portion 16a.

Since the front surface forming portion 16b is a portion coming into contact with the occupant P, the width Wb thereof is formed so as to be the widest. The width Wc of the upper surface forming portion 16c squeezes the shape of the inflation and deployment of the front portion of the airbag 1 and is set to be a width that can be housed inside the inner case 42. Since the end portion of the lower surface forming portion 16a is a portion that is joined to the upper surface forming portion 16c, it is preferable that the end portion thereof have a size that is substantially the same as the width Wc. Then, the width Wa of the narrow width portion 51 is set to be smaller than the width Wc of the upper surface forming portion 16c. Therefore, the size of each width has a relationship of the width Wa<the width Wc<the width Wb. It is possible to arbitrarily set the position, the length and the size of the narrow width portion 51 having the width Wa depending on conditions of the size of the airbag 1, the shape of the instrument panel I, the size or the position of the convex portion C and the like.

It is possible to form the airbag 1 having the shape of the inflation and deployment as illustrated in FIG. 1 by forming a bag body by joining the center panel 16 to the outer periphery of the side panels 15. FIGS. 3(A) and 3(B) are views illustrating the shape of the inflation and deployment of the airbag 1 and are front views seen from the side of the occupant. In a first example illustrated in FIG. 3(A), a control panel C1 configuring the convex portion C is formed in the front surface of the instrument panel I in front of the occupant, and in a second example illustrated in FIG. 3(B), a cup holder C2 configuring the convex portion C is disposed in the front surface of the instrument panel I in front of the occupant.

As illustrated in FIGS. 3(A) and 3(B), the front views of the airbag 1 that is inflated and deployed have a circular shape or a vertically long elliptical shape by the side panels 15 being inflated laterally. The narrow width portion 51 of the center panel 16 is disposed in a position adjacent to the convex portion C (the control panel C1 or the cup holder C2). An imaginary line H illustrated by a two-dot chain line indicates a cross section of line X-X of the airbag 1 in FIG. 1.

As described above, the side panel 15 is partially pulled inwardly by forming the narrow width portion 51 in the lower surface forming portion 16a of the center panel 16. As a result, as illustrated by the imaginary line H, both the lower side portions of the airbag 1 have a cross-section shape that is pulled inwardly more than the circular shape or the vertically long elliptical shape, and the concave portion 5 is formed on a surface of the airbag 1.

As described above, it is possible to avoid interference or collision between the convex portion C such as the control panel C1 or the cup holder C2 and the airbag 1 and it is possible to maintain a posture of the inflation and deployment of the airbag 1 by forming the concave portion 5 in both the lower side portions of the airbag 1. Further, according to the embodiment, since it is not necessary to form a specific internal pressure adjustment mechanism or a sub-bag portion in the airbag 1 as described in Japanese Unexamined Patent Application Publication No. 2005-14864 or Japanese Unexamined Patent Application Publication No. 2007-38713, it is possible to eliminate a factor of increase in cost and it is possible to reduce the weight of the airbag 1. It is possible to easily maintain the balance between the left and right of the airbag by forming the concave portion 5 in both the side portions of the airbag 1.

Figure 5:
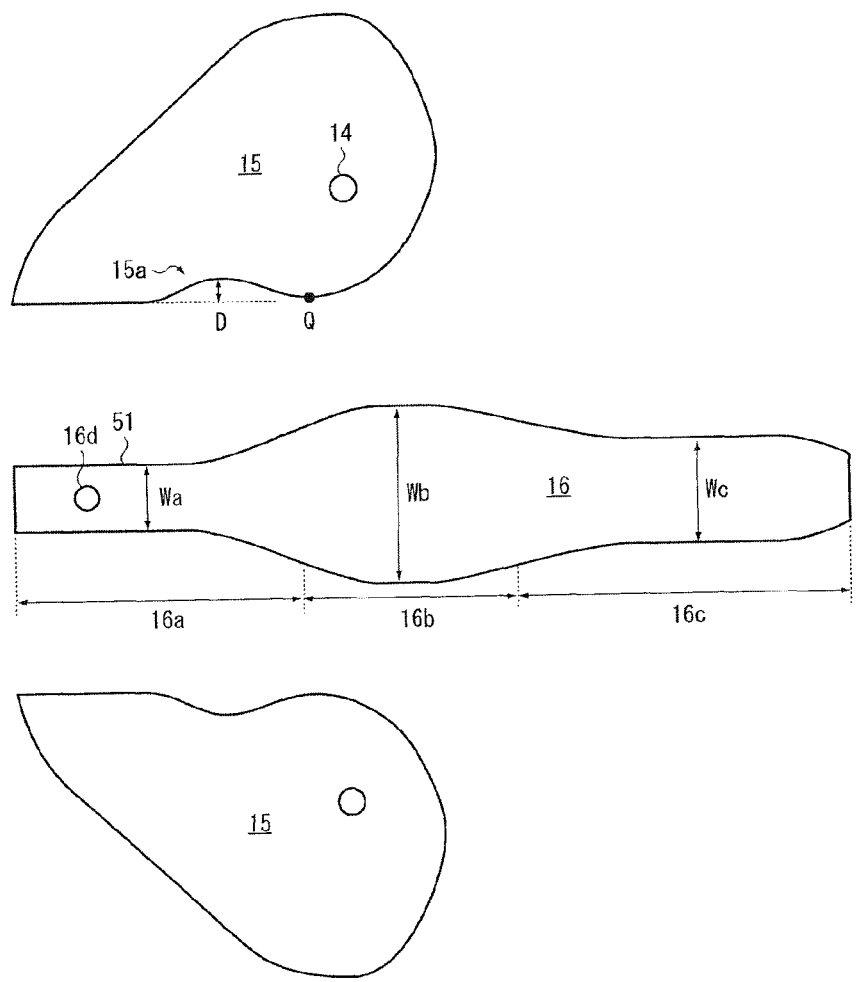
FIG. 5 is a panel configuration view of the airbag illustrated in FIG. 4.
Figure 6A:
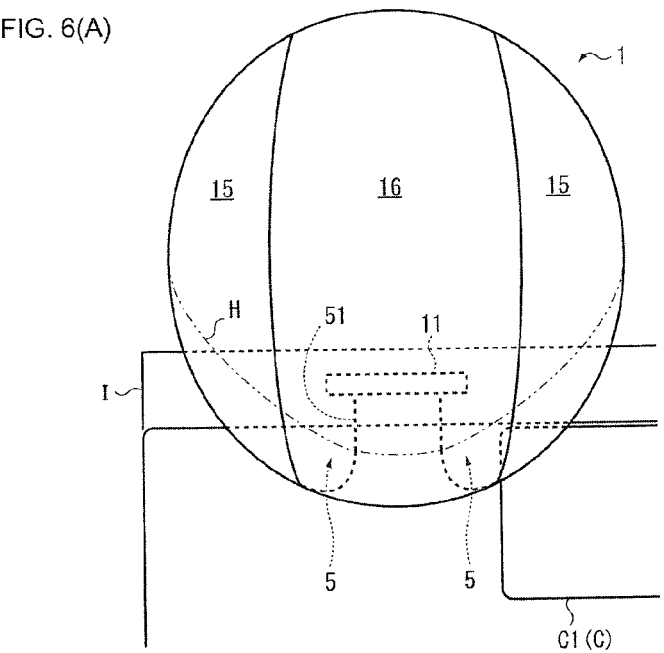
FIG. 6(A) illustrates a first example and FIG. 6(B) illustrates a second example.
Figure 6B:
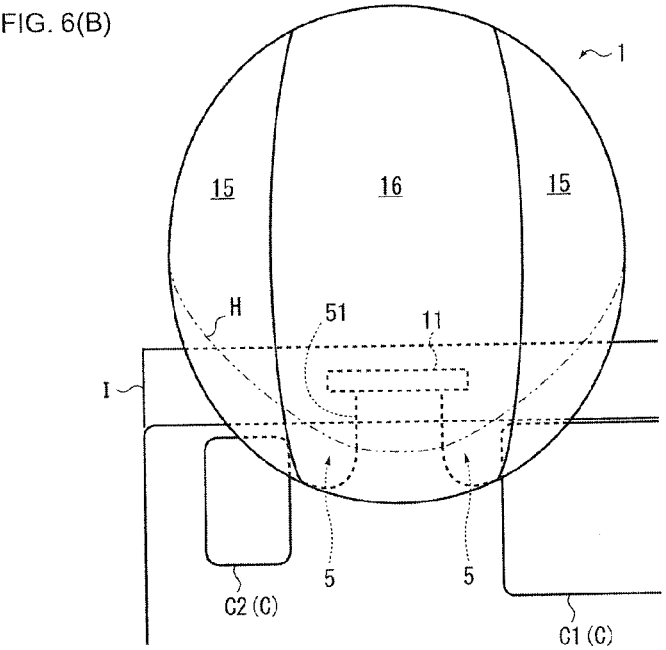

An airbag according to the second embodiment of the invention is described with reference to FIGS. 4 to 6. FIG. 4 is an entire configuration view illustrating the airbag device according to the second embodiment of the invention. FIG. 5 is a panel configuration view of the airbag illustrated in FIG. 4. FIG. 6 is a front view illustrating a shape of inflation and deployment of the airbag illustrated in FIG. 4, in which FIG. 6(A) illustrates a first example and FIG. 6(B) illustrates a second example. The same reference numerals are given to the same configuring parts as in the first embodiment set forth above in order to omit redundant description.

A second embodiment illustrated in FIG. 4 is a modification of the shape of the side panels 15 and the center panel 16 configuring the airbag 1. Further, in the second embodiment, an angle θ of the instrument panel I may be formed to be greater than an angle θ (approximately 90°) of the first embodiment. If the angle θ is greater than 90°, the instrument panel I forms an inclined surface in front of the occupant P.

If the airbag 1 is mounted on the instrument panel I having the inclined surface, for example, as illustrated in FIG. 5, a depth D of the side panel 15 may be shallower than that in the first embodiment and a position of a back lowest endpoint Q may be disposed above the position thereof in the first embodiment since there is little need to let the airbag 1 greatly get under the instrument panel I.

Further, the center panel 16 may be formed so that a portion of the side of the end portion of the lower surface forming portion 16a, that is, a main portion of the lower surface forming portion 16a may be formed to have a width Wa. Further, a main portion of the upper surface forming portion 16c is formed to have the width Wc and a width of the end portion is reduced to connect to the lower surface forming portion 16a. "Main portion of the lower surface forming portion 16a" means a portion other than a portion of the lower surface forming portion 16a, of which a width is widened to connect to the front surface forming portion 16b. Similarly, "main portion of the upper surface forming portion 16c" means a portion other than a portion of the upper surface forming portion 16c, of which a width is widened to connect to the front surface forming portion 16b and a portion, of which a width is narrowed to connect to the lower surface forming portion 16a.

Also in the second embodiment, the width Wa of the narrow width portion 51 is set to be narrower than the width Wb of the front surface forming portion 16b and the width Wc of the upper surface forming portion 16c, and have a relationship of the width Wa<the width Wc<the width Wb. When the airbag 1 is inflated and deployed, as illustrated in FIGS. 6(A) and 6(B), the side panel 15 is partially pulled inwardly by the narrow width portion 51 of the center panel 16 and as illustrated by the imaginary line H, both the lower side portions of the airbag 1 have a cross-section shape that is pulled inwardly more than the circular shape or the vertically long elliptical shape, and the concave portion 5 is formed on a surface of the airbag 1. Moreover, the imaginary line H (the two-dot chain line) illustrated in FIGS. 6(A) and 6(B) shows a cross section taken along line X-X of the airbag 1 in FIG. 4.

Moreover, the center panel 16 illustrated in FIGS. 2 and 5 is disposed in which the lower surface forming portion 16a, the front surface forming portion 16b and the upper surface forming portion 16c from the left side of the view are aligned, and it is possible to arbitrary set a sewn position (that is, a cutting position of the center panel 16) of the center panel 16 in the longitudinal direction. Therefore, for example, the center panel 16 may be cut in order for the sewn position to be formed in an intermediate portion of the lower surface forming portion 16a or the upper surface forming portion 16c.

Further, the airbag 1 illustrated in FIG. 4 has a rectification body 13 that is configured of a partition wall. At least the upper end and the lower end of the rectification body 13 are connected to the inner surface of the airbag 1, and the rectification body 13 separates the inside of the airbag 1 into a front chamber 1a and a rear chamber 1b. Further, the rectification body 13 has a first opening portion 13a that discharges gas so that the lower surface of the airbag 1 comes into close contact with the surface of the instrument panel I, and a second opening portion 13b that discharges gas toward an upper surface side of the airbag 1. It is possible to hold the internal pressure of the tail portion 12 by increasing the internal pressure of the front chamber 1a with this configuration.

Moreover, in the first embodiment and the second embodiment described above, whether the rectification body 13 is adopted to be the bag shape or to be the partition wall shape is a matter of choice depending on conditions such as the size of the airbag 1. However, in the self-standing airbag described above, the rectification body 13 is not an essential configuration part and if the airbag 1 is capable of standing by itself only with the internal pressure of the airbag 1, the rectification body 13 may be omitted.

Figure 7A:
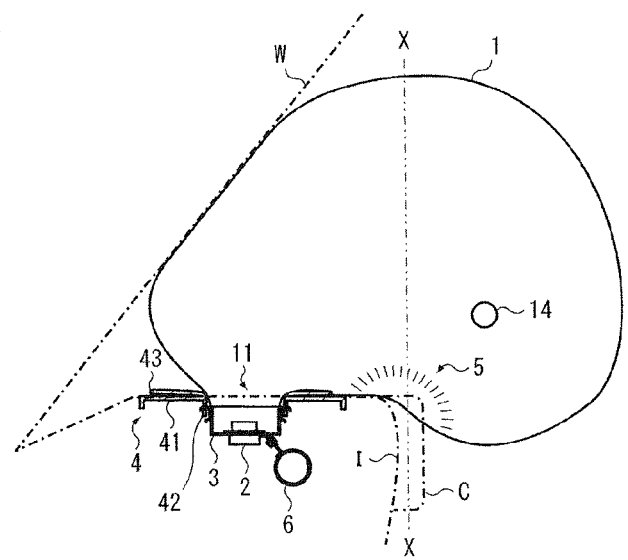
FIG. 7(A) illustrates a third embodiment.
Figure 7B:
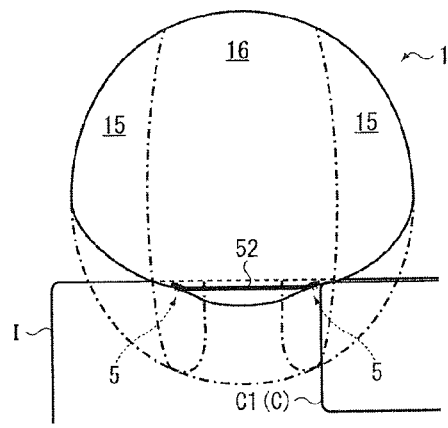
FIG. 7(B) illustrates a fourth embodiment.
Figure 7C:
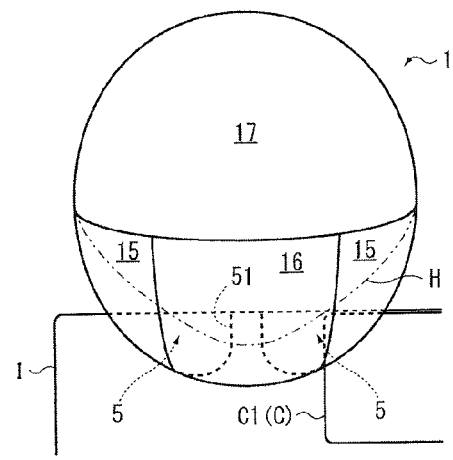
FIG. 7(C) illustrates a fifth embodiment.

An airbag according to another embodiment of the invention is described with reference to FIG. 7, which is a view illustrating an airbag device according to other embodiments of the invention, where FIG. 7(A) illustrates a third embodiment, FIG. 7(B) illustrates a fourth embodiment, and FIG. 7(C) illustrates a fifth embodiment. The same reference numerals are given to the same configuration parts as n the first embodiment set forth above in order to omit redundant description.

In an airbag device according to the third embodiment illustrated in FIG. 7(A), a concave portion 5 is formed in an airbag 1 (that is, a non-self-standing airbag) that is positioned by abutting against a windshield W. At the time of inflation and deployment, the non-self-standing airbag 1 is inflated and deployed along the windshield W and an instrument panel I crossing over a convex portion C.

In an airbag device according to the fourth embodiment illustrated in FIG. 7(B), a concave portion 5 is formed by a tether 52 connecting each of lower inner surfaces of the side panels 15. FIG. 7(B) illustrates a cross-sectional view taken along line X-X of the airbag 1 in FIG. 7(A). When the airbag 1 is inflated and deployed, the side panel 15 is partially pulled inwardly and both the lower side portions of the airbag 1 have a cross-section shape that is pulled inwardly more than a circular shape or a vertically long elliptical shape, and the concave portion 5 can be formed on a surface of the airbag 1 by disposing the tether 52. For example, the tether 52 has a strip shape and is configured of a base fabric of the same material as that of the side panel 15 or the center panel 16. In FIG. 7(B), for the sake of convenience of the description, the tether 52 is shown in a bold line.

Moreover, even though not illustrated, if the concave portion 5 is formed by the tether 52, it is possible to omit the center panel 16 configuring the airbag 1. Therefore, for example, it is possible to form the concave portion 5 by connecting the tether 52 even in the airbag 1 having the panel configuration which is divided into two upper and lower sides.

An airbag device according to a fifth embodiment illustrated in FIG. 7(C) is a modification of the panel configuration of the airbag 1. The airbag 1 is substantially divided into two upper and lower sides, and has an upper panel 17 that configures an upper portion of the airbag 1, and a lower panel that configures a lower portion of the airbag 1. The lower panel is configured of a pair of side panels 15 and a center panel 16. A narrow width portion 51 is formed in the center panel 16. It is possible to form the concave portion 5 in both the lower side portions of the airbag 1 even in the panel configuration.

Figure 8A:
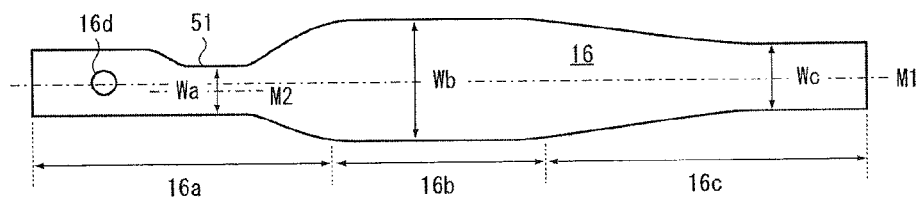
FIG. 8(A) is a plan view of a center panel and FIG. 8(B) is a front view illustrating a shape of inflation and deployment of the airbag.
Figure 8B:
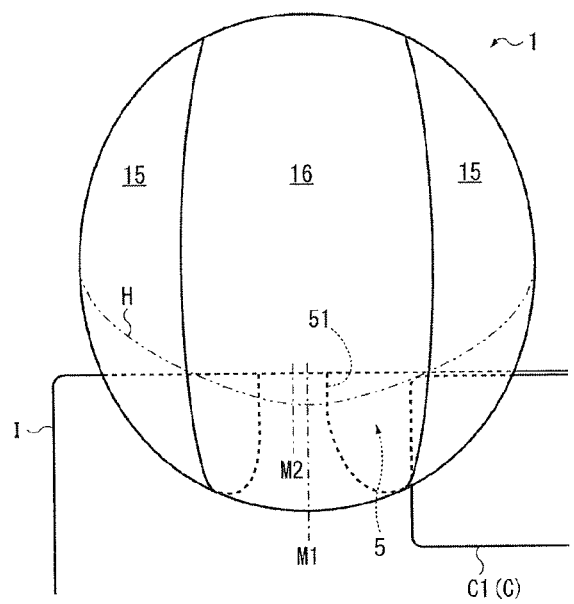

An airbag according to a sixth embodiment of the invention is described with reference to FIG. 8, which is a view illustrating an airbag device according to the sixth embodiment of the invention where FIG. 8(A) is a plan view of a center panel and FIG. 8(B) is a front view illustrating a shape of inflation and deployment of the airbag. The same reference numerals are given to the same configuration parts as in the first embodiment set forth above so as to omit redundant description.

In the airbag device according to the sixth embodiment illustrated in FIGS. 8(A) and 8(B), a concave portion 5 is formed in only one of both the lower side portions of an airbag 1. For example, the concave portion 5 is formed on the side interfering with a control panel C1 configuring a convex portion C. If the concave portion 5 is formed on one side only, as illustrated in FIG. 8(A), a center line M2 of a narrow width portion 51 may be shifted from a center line M1 of a center panel 16. That is, in the embodiment, the narrow width portion 51 is formed by cutting out only one side of a part of a lower surface forming portion 16a of the center panel 16. As a matter of course, the narrow width portion 51 can be also formed by varying sizes of the left and right cutouts.

According to the embodiment, even if a convex portion C is formed on one side of the airbag 1 as illustrated in FIG. 8(B), it is possible to expand and develop the airbag 1 so as to avoid the convex portion C. Moreover, the concave portion 5 may be formed on a side opposite to the concave portion 5 illustrated in the sixth embodiment described above.

The invention is not limited to the embodiments described above and, of course, it is possible to modify the embodiments variously without departing from the scope of the invention, for example, making front-back positions of the left and right concave portions 5 shifted, varying the sizes or depths of the left and right concave portions 5, and the like.

What is claimed is:
1. An airbag structure, comprising:
an airbag;
an instrument panel that the airbag is folded and housed therein, and the airbag is inflated and deployed therefrom, having a surface thereon; and
a windshield arranged apart from the airbag,
wherein the airbag that is folded and housed in an opening portion of the instrument panel during a normal state and is inflated and deployed on a surface of the instrument panel by gas supplied in an emergency, the airbag comprising:
a lower portion including an opening portion through which the gas is supplied, and a flat portion having two sides parallel to each other and in which the opening portion is formed, the flat portion being adapted to contact the surface of the instrument panel when the airbag is inflated and deployed;
an occupant contact surface adapted to contact an occupant;
an upper surface; and
concave portions formed at the two sides of the lower portion and dented from the flat portion toward the upper surface when the airbag is inflated and deployed, the concave portions being adapted to avoid contacting a convex portion of the instrument panel,
wherein the airbag has at least a pair of side panels that is arranged at the two sides of the lower portion, and a center panel that connects each of lower parts of the pair of side panels, and includes a narrow width portion to form the concave portions,
the center panel has a lower surface forming portion that includes the flat portion of the airbag, a front surface forming portion that includes the occupant contact surface adapted to contact the occupant, and an upper surface forming portion that includes the upper surface of the airbag,
the narrow width portion is formed adjacent to the flat portion and has a width narrower than those of the front surface forming portion and the upper surface forming portion to partially pull the pair of side panels inwardly, thereby the airbag has a cross-section shape pulled inwardly adapted to avoid the convex portion formed in the instrument panel,
each of outer peripheries of the pair of side panels includes a flat portion, a first curved portion extending from the flat portion and curved inwardly to form a dent, a second curved portion extending from the first curved portion and curved outwardly to form a lowest endpoint, and a third curved portion extending from the second curved portion to the flat portion and curved outwardly to substantially form a semicircle,
the pair of side panels is respectively connected to side portions of the center panel along the outer peripheries of the pair of side panels such that the first curved portion is connected to the narrow width portion to form the concave portion in each of the pair of side panels,
when the airbag is inflated and deployed, the dent of the first curved portion is located above the flat portion, and the lowest endpoint of the second curved portion is located under the flat portion, the front surface forming portion has a width wider than that of the upper surface forming portion adapted to widely cover the occupant, wherein the lower surface further includes a reduced width portion extending between the flat portion and the narrow width portion to reduce a width of the flat portion to that of the narrow width portion, and a widened portion extending between the narrow width portion and the front surface forming portion and having a width wider than that of the flat portion; and the concave portions are each formed at a portion connecting the first curved portion and a side portion of the lower surface between the reduced width portion and the widened portion.

2. The airbag structure according to claim 1, wherein the concave portions are formed through a tether that connects inner surfaces of the pair of side panels of the airbag.

3. An airbag structure according to claim 1, further comprising:

an inflator that supplies the gas to the airbag;
a retainer that holds the airbag and the inflator; and
an airbag cover that covers the airbag and forms a part of the instrument panel.

4. The airbag according to claim 1, wherein when the airbag is inflated and deployed, the concave portions are upwardly expanded from the narrow width portion.

5. The airbag structure according to claim 1, wherein the instrument panel includes two convex portions apart from each other, and when the airbag is inflated and deployed, the concave portions of the airbag are arranged between the two convex portions to avoid contacting the two convex portions.

6. An airbag structure according to claim 1, wherein the flat portion is a contact portion contacting the surface of the instrument panel to self-stand the airbag when the airbag is inflated and deployed.

7. An airbag structure according to claim 1, wherein the airbag is a self-standing airbag inflated and deployed without a reaction force from the windshield.

* * * * *